(12) United States Patent
Rosenfeld

(10) Patent No.: US 6,611,278 B2
(45) Date of Patent: *Aug. 26, 2003

(54) METHOD FOR AUTOMATICALLY ANIMATING LIP SYNCHRONIZATION AND FACIAL EXPRESSION OF ANIMATED CHARACTERS

(76) Inventor: Maury Rosenfeld, 4941 Ambrose Ave, Los Angeles, CA (US) 90027

( * ) Notice: Subject to any disclaimer, the term of this patent is extended or adjusted under 35 U.S.C. 154(b) by 0 days.

This patent is subject to a terminal disclaimer.

(21) Appl. No.: 09/960,831

(22) Filed: Sep. 21, 2001

(65) Prior Publication Data

US 2002/0101422 A1 Aug. 1, 2002

Related U.S. Application Data

(63) Continuation of application No. 08/942,987, filed on Oct. 2, 1997, now Pat. No. 6,307,576.

(51) Int. Cl.[7] .............................. G06T 13/00; G09G 5/00
(52) U.S. Cl. ........................ 345/956; 345/473; 345/646
(58) Field of Search ................................ 345/473, 646, 345/647, 951, 953, 955, 956, 957

(56) References Cited

U.S. PATENT DOCUMENTS

| | | | | |
|---|---|---|---|---|
| 4,600,919 A | * | 7/1986 | Stern .......................... | 345/473 |
| 5,416,899 A | * | 5/1995 | Poggio et al. ............... | 345/475 |
| 5,630,017 A | * | 5/1997 | Gasper et al. ............... | 704/276 |
| 5,684,942 A | * | 11/1997 | Kimura ....................... | 345/473 |
| 5,717,848 A | * | 2/1998 | Watanabe et al. ........... | 345/474 |
| 5,741,136 A | * | 4/1998 | Kirksey et al. ............. | 434/169 |
| 5,818,461 A | * | 10/1998 | Rouet et al. ................ | 345/473 |
| 5,880,788 A | * | 3/1999 | Bregler ....................... | 348/515 |
| 5,907,351 A | * | 5/1999 | Chen et al. ............. | 348/14.12 |
| 6,097,381 A | * | 8/2000 | Scott et al. ............. | 707/500.1 |
| 6,108,011 A | * | 8/2000 | Fowler ........................ | 345/441 |
| 6,147,692 A | * | 11/2000 | Shaw et al. ................. | 345/433 |
| 6,232,965 B1 | * | 5/2001 | Scott et al. ................ | 707/505 |
| 6,307,576 B1 | * | 10/2001 | Rosenfeld ................... | 345/700 |

* cited by examiner

Primary Examiner—Jeffery Brier
Assistant Examiner—Ryan Yang
(74) Attorney, Agent, or Firm—The Hecker Law Group

(57) ABSTRACT

A method for controlling and automatically animating lip synchronization and facial expressions of three dimensional animated characters using weighted morph targets and time aligned phonetic transcriptions of recorded text. The method utilizes a set of rules that determine the systems output comprising a stream of morph weight sets when a sequence of timed phonemes and/or other timed data is encountered. Other data, such as timed emotional state data or emotemes such as "surprise, "disgust, "embarrassment", "timid smile", or the like, may be inputted to affect the output stream of morph weight sets, or create additional streams.

36 Claims, 4 Drawing Sheets

METHOD FOR AUTOMATICALLY ANIMATING LIP SYNCHRONIZATION AND FACIAL EXPRESSION OF ANIMATED CHARACTERS

This is a continuation of application Ser. No. 08/942,987 filed Oct. 2, 1997, now U.S. Pat. No. 6,307,576.

BACKGROUND OF THE INVENTION

1. Field of Invention

This invention relates generally to animation producing methods and apparatuses, and more particularly is directed to a method for automatically animating lip synchronization and facial expression for three dimensional characters.

2. Description of the Related Art

Various methods have been proposed for animating lip synchronization and facial expressions of animated characters in animated products such as movies, videos, cartoons, CD's, and the like. Prior methods in this area have long suffered from the need of providing an economical means of animating lip synchronization and character expression in the production of animated products due to the extremely laborious and lengthy protocols of such prior traditional and computer animation techniques. These shortcomings have significantly limited all prior lip synchronization and facial expression methods and apparatuses used for the production of animated products. Indeed, the limitations of cost, time required to produce an adequate lip synchronization or facial expression in an animated product, and the inherent imitations of prior methods and apparatuses to satisfactorily provide lip synchronization or express character feelings and emotion, leave a significant gap in the potential of animated methods and apparatuses in the current state of the art.

Time aligned phonetic transcriptions (TAPTS) are a phonetic transcription of a recorded text or soundtrack, where the occurrence in time of each phoneme is also recorded. A "phoneme" is defined as the smallest unit of speech, and corresponds to a single sound. There are several standard phonetic "alphabets" such as the International Phonetic Alphabet, and TIMIT created by Texas instruments, Inc. and MIT. Such transcriptions can be created by hand, as they currently are in the traditional animation industry and are called "x" sheets, or "gray sheets" in the trade. Alternatively such transcriptions can be created by automatic speech recognition programs, or the like.

The current practice for three dimensional computer generated speech animation is by manual techniques commonly using a "morph target" approach. In this practice a reference model of a neutral mouth position, and several other mouth positions, each corresponding to a different phoneme or set of phonemes is used. These models are called "morph targets". Each morph target has the same topology as the neutral model, the same number of vertices, and each vertex on each model logically corresponds to a vertex on each other model, or example, vertex #n on all models represents the left corner of the mouth, and although this is the typical case, such rigid correspondence may not be necessary.

The deltas of each vertex on each morph target relative to the neutral are computed as a vector from each vertex n on the reference to each vertex n on each morph target. These are called the delta sets. There is one delta set for each morph target.

In producing animation products, a value usually from 0 to 1 is assigned to each delta set by the animator and the value is called the "morph weight". From these morph weights, the neutral's geometry is modified as follows: Each vertex N on the neutral has the corresponding delta set's vertex multiplied by the scalar morph weight added to it. This is repeated for each morph target, and the result summed. For each vertex v in the neutral model:

$$|result|=|neutral|+\Sigma_{x=1}{}^{n}|delta\ setx|morph\ weigh$$

where the symbol |xxx| is used to indicate the corresponding vector in each referenced set. For example, |result| is the corresponding resultant vertex to vertex v in the neutral model |neutral| and |delta setx| is the corresponding vector for delta set x.

If the morph weight of the delta set corresponding to the morph target of the character saying, for example, the "oh" sound is set to 1, and all others are set to 0, the neutral would be modified to look like the "oh" target. If the situation was the same, except that the "oh" morph weight was 0.5, the neutral's geometry is modified half way between neutral and the "oh" morph target.

Similarly, if the situation was as described above, except "oh" weight was 0.3 and the "ee" morph weight was at 0.7, the neutral geometry is modified to have some of the "oh" model characteristics and more of the "ee" model characteristics. There also are prior blending methods including averaging the delta sets according to their weights.

Accordingly, to animate speech, the artist needs to set all of these weights at each frame to an appropriate value. Usually this is assisted by using a "keyframe" approach, where the artist sets the appropriate weights at certain important times ("keyframes") and a program interpolates each of the channels at each frame. Such keyframe approach is very tedious and time consuming, as well as inaccurate due to the large number of keyframes necessary to depict speech.

The present invention overcomes many of the deficiencies of the prior art and obtains its objectives by providing an integrated method embodied in computer software for use with a computer for the rapid, efficient lip synchronization and manipulation of character facial expressions, thereby allowing for rapid, creative, and expressive animation products to be produced in a very cost effective manner.

Accordingly, it is the primary object of this invention to provide a method for automatically animating lip synchronization and facial expression of three dimensional characters, which is integrated with computer means for producing accurate and realistic lip synchronization and facial expressions in animated characters. The method of the present invention further provides an extremely rapid and cost effective means to automatically create lip synchronization and facial expression in three dimensional animated characters.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a method is provided for controlling and automatically animating lip synchronization and facial expressions of three dimensional animated characters using weighted morph targets and time aligned phonetic transcriptions of recorded text, and other time aligned data. The method utilizes a set of rules that determine the systems output comprising a stream or streams of morph weight sets when a sequence of timed phonemes or other timed data is encountered. Other timed data, such as pitch, amplitued, noise amounts, or emotional state data or emotemes such as "surprise, "disgust, "embarrassment", "timid smile", or the like, may be inputted to affect the output stream of morph weight sets.

The methodology herein described allows for automatically animating lip synchronization and facial expression of three dimensional characters in the creation of a wide variety of animation products, including but not limited to movies, videos, cartoons, CD's, software, and the like. The method and apparatuses herein described are operably integrated with computer software and hardware.

In accordance with the present invention there also is provided a method for automatically animating lip synchronization and facial expression of three dimensional characters for films, videos, cartoons, and other animation products, comprising configuring a set of default correspondence rules between a plurality of visual phoneme groups and a plurality of morph weight sets; and specifying a plurality of morph weight set transition rules for specifying durational data for the generation of transitionary curves between the plurality of morph weight sets, allowing for the production of a stream of specified morph weigh sets to be processed by a computer animation system for integration with other animation, whereby animated lip synchronization and facial expression of animated characters may be automatically controlled and produced.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1A:
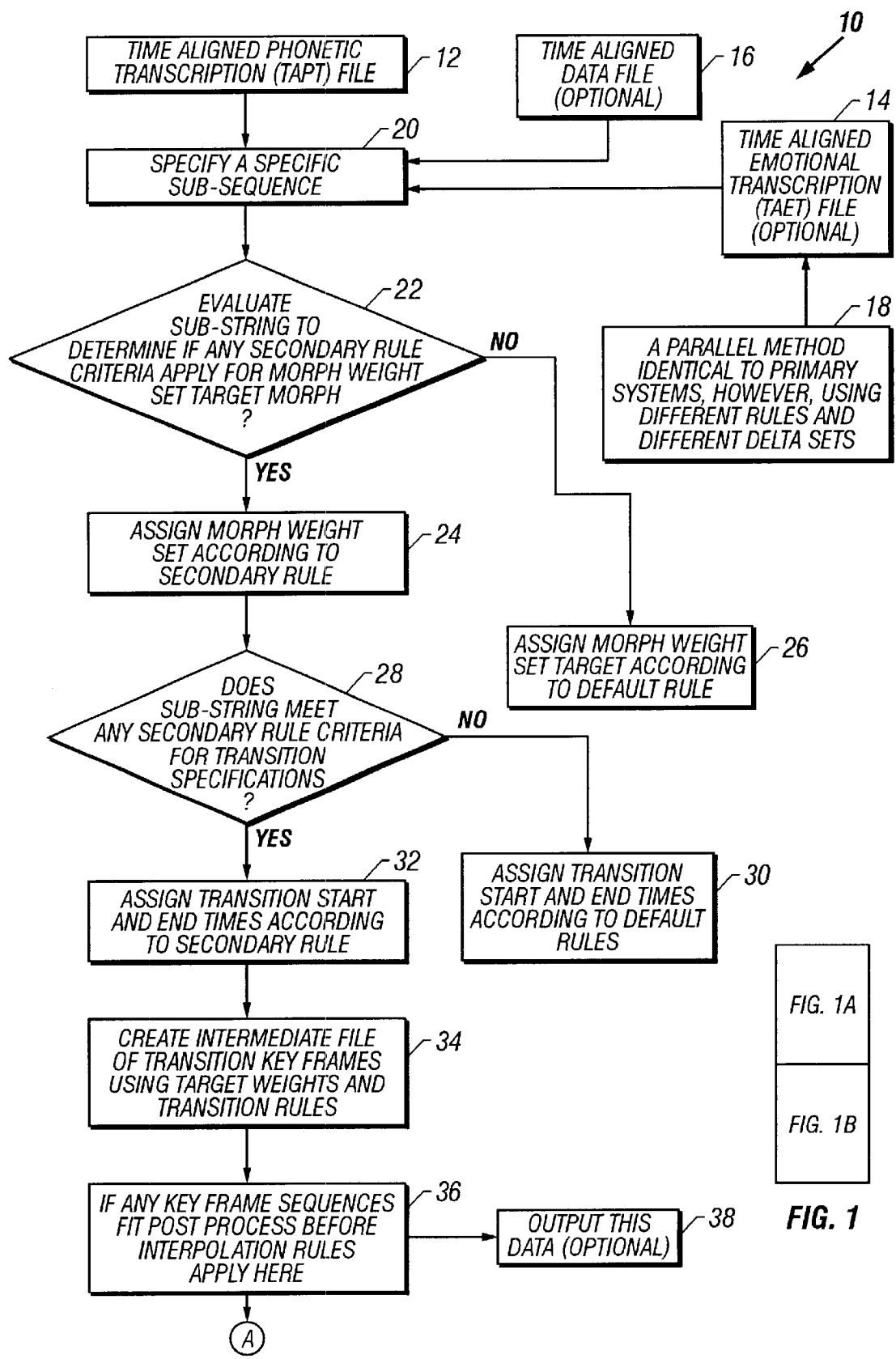
FIG. 1 is a flow chart showing the method of the invention with an optional time aligned emotional transcription file, and another parallel timed data file, according to the invention.
Figure 1B:
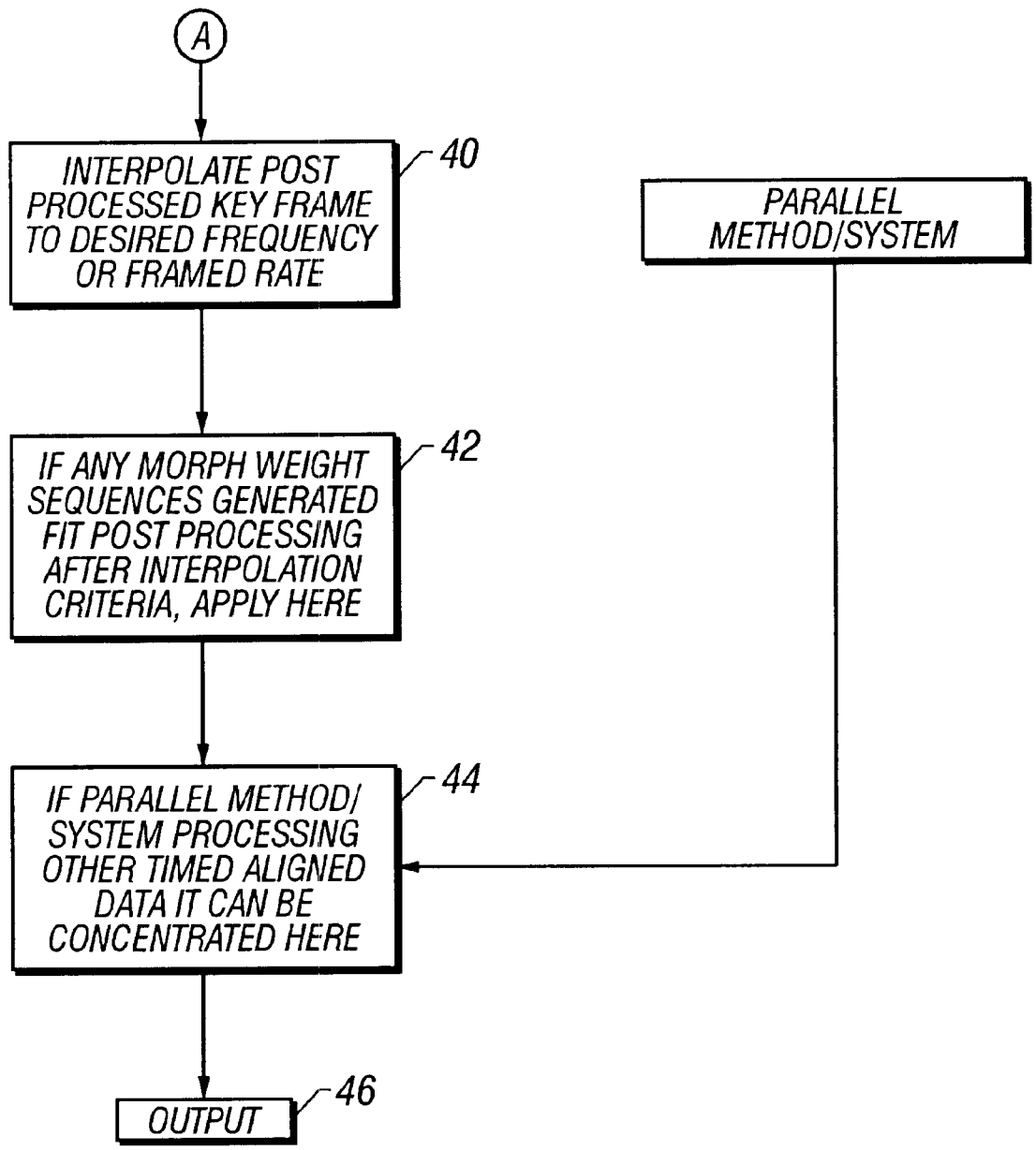
Figure 2:
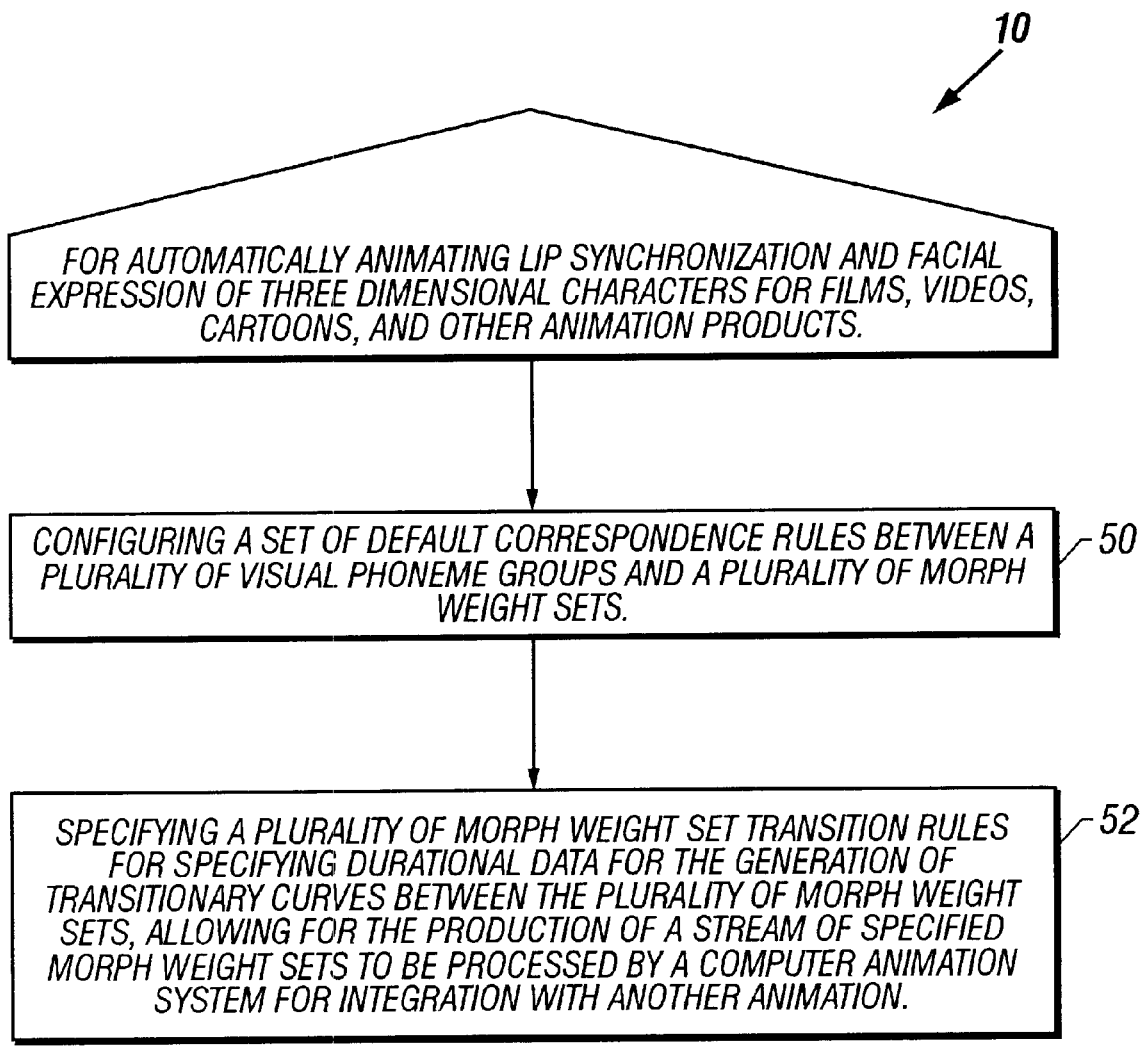
FIG. 2 is a flow chart illustrating the principal steps of the present method, according to the invention.
Figure 3:
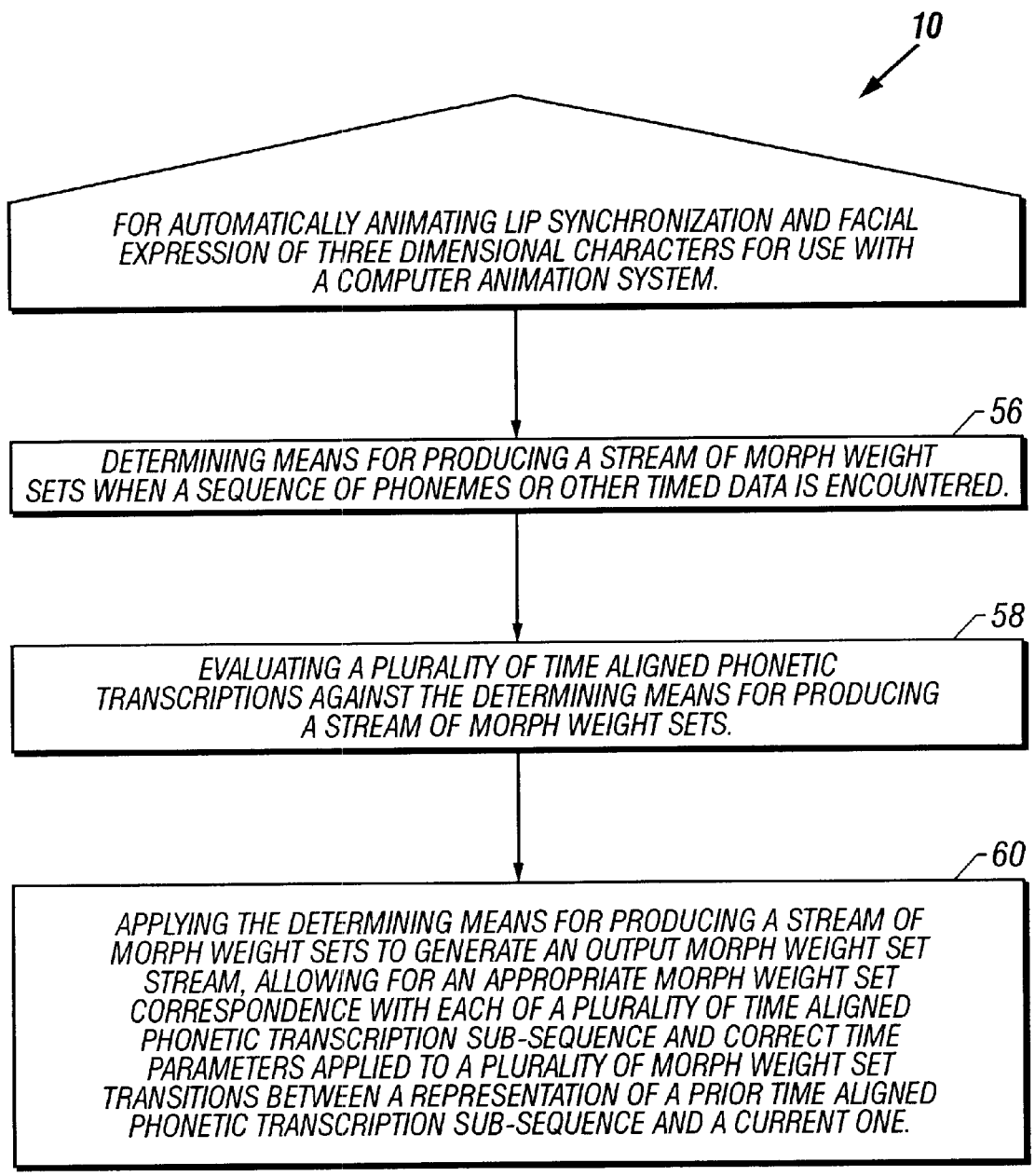
FIG. 3 is another representational flow chart illustrating the present method, according to the invention.

In accordance with the present invention, there is provided as illustrated in FIGS. 1–3, a method for controlling and automatically animating lip synchronization and facial expressions of three dimensional animated characters using weighted morph targets and time aligned phonetic transcriptions of recorded text. The method utilizes a set of rules that determine the systems output comprising a stream of morph weight sets when a sequence of timed phonemes is encountered. Other timed data, such as timed emotional state data or emotemes such as "surprise, "disgust, "embarrassment", "timid smile", pitch, amplitued, noise amounts or the like, may be inputted to affect the output stream of morph weight sets.

The method comprises, in one embodiment, configuring a set of default correspondence rules between a plurality of visual phoneme groups and a plurality of morph weight sets; and specifying a plurality of morph weight set transition rules for specifying durational data for the generation of transitionary curses between the plurality of morph weight sets, allowing for the production of a stream of specified morph weight sets to be processed by a computer animation system for integration with other animation, whereby animated lip synchronization and facial expression of animated characters may be automatically produced.

There is also provided, according to the invention a method for automatically animating lip synchronization and facial expression of three dimensional characters for use with a computer animation system, comprising the steps of: determining means for producing a stream of morph weight sets when a sequence of phonemes is encountered; evaluating a plurality of time aligned phonetic transcriptions or other timed data such as pitch, amplitude, noise amounts and the like, against the determining means for producing a stream of morph weight sets; applying said determining means for producing a stream of morph weight sets to generate an output morph weight set stream, allowing for an appropriate morph weight set correspondence with each of a plurality of time aligned phonetic transcription subsequences and correct time parameters applied to a plurality of morph weight set transitions between a representation of a prior time aligned phonetic transcription subsequence and a current one, whereby lip synchronization and facial expressions of animated characters is automatically controlled and produced.

The method preferably comprises a set of rules that determine what the output morph weight set stream will be when any sequence or phonemes and their associated times is encountered. As used herein, a "morph weight set" is a set of values, one for each delta set, that, when applied as described, transform the neutral mode to some desired state, such as speaking the "oo" sound or the "th" sound. Preferably, one model id designated as the anchor model, which the deltas are computed in reference to. If for example, the is a morph target that represents all possible occurrences of an "e" sound perfectly, it's morph weight set would be all zeros for all delta sets except for the delta set corresponding to the "ee" morph target, which would set to 1.

Preferably, each rule comprises two parts, the rule's criteria and the rule's function. Each sub-sequence of time aligned phonetic transcription (TAPT) or other timed data such as pitch, amplitude, noise amount or the like, is checked against a rule's criteria to see if that rule is applicable. If so, the rule's function is applied to generate the output. The primary function of the rules is to determined 1) the appropriate morph weight set correspondence with each TAPT sub-sequence; and 2) the time parameters of the morph weight set transitions between the representation of the prior TAPT sub-sequence or other timed data and the current one. Conditions 1) and 2) must be completely specified for any sequence of phonemes and times encountered. Together, such rules are used to create a continuous stream of morph weight sets.

In the present method, it is allowable for more than one phoneme to be represented by the same morph target, for example, "sss" and "zzz". Visually, these phonemes appear similar. Through the use of such rules, the user can group phonemes together that have a similar visual appearance into visual phonemes" that function the same as one another. It is also acceptable, through the rules, to ignore certain phoneme sequences. For example, a rule could specify: "If in the TAPT, there are two or more adjacent phonemes that are in the same "visual phoneme" group, all but the first are ignored".

The rules of the present method may be categorized in three main groupings; default rules, auxiliary rules and post processing rules. The default rules must be complete enough to create valid output for any TAPT encountered at any point in the TAPT. The secondary rules are used in special cases; for example, to substitute alternative morph weight set correspondences and/or transition rules if the identified criteria are met. The post processing rules are used to further manipulate the morph weight set stream after the default or secondary rules are applied, and can further modify the members of the morph weight sets determined by the default and secondary rules and interpolation.

If for example, specific TAPT subsequence does not fit the criteria for any secondary rules, then the default rules take effect. If, on the other hand, the TAPT sub-sequence does fit the criteria for a secondary rule(s) they take precedence over the default rules. A TAPT sub-sequence take into account the current phoneme and duration, and a number of the preceding and following phonemes and duration's as well may be specified.

Preferably, the secondary rules effect morph target correspondence and weights, or transition times, or both. Secondary rules can create transitions and correspondences even where no phoneme transitions exist. The secondary rules can use as their criteria the phoneme, the duration or the phoneme's context in the output stream, that is what phonemes are adjacent or in the neighborhood to the current phoneme, what the adjacent duration's are, and the like.

The post processing rules are preferably applied after a preliminary output morph weight set is calculated so as to modify it. Post processing rules can be applied before interpolation and/or after interpolation, as described later in this document. Both the secondary and post processing rules are optional, however, they may in certain applications be very complex, and in particular circumstances contribute more to the output than the default rules.

In FIG. 1, a flow chart illustrates the preferred steps of the methodology 10 or automatically animating lip synchronization and facial expression of three dimensional animated characters of the present invention. A specific sub-sequence 20 is selected from the TAPT file 12 and is evaluated 22 to determine if any secondary rule criteria for morph weight set target apply. Time aligned emotional transcription file 14 data may be inputted or data from an optional time aligned data file 16 may be used. Also shown is a parallel method 18 which may be configured identical to the primary method described, however, using different timed data rules and different delta sets. Sub-sequence 20 is evaluated 22 to determine if any secondary rule criteria apply. If yes, then a morph weight set is assigned 24 according to the secondary rules, if no, then a morph weight set is assigned 26 according to the default rules. If the sub-string meets any secondary rule criteria for transition specification 28 then a transition start and end time are assigned according to the secondary rules 32, if no, then assign transition start and end times 30 according to default rules. Then an intermediate file of transition keyframes using target weights and transition rules as generated are created 34, and if any keyframe sequences fit post process before interpolation rules they are applied here 36. This data may be output 38 here if desired. If not, then interpolate using any method post processed keyframes to a desired frequency or frame rate 40 and if any morph weight sequences generated fit post processing after interpolation criteria, they are applied 42 at this point. If parallel methods or systems are used to process other timed aligned data, they may be concatenated here 44, and the data output 46.

In FIG. 2, the method for automatically animating lip synchronization and facial expression of three dimensional characters for films, videos, cartoons, and other animation products 10 is shown according to the invention, where box 50 show the step of configuring a set of default correspondence rules between a plurality of visual phoneme groups or other timed input data and a plurality of morph weight sets. Box 52 shows the steps of specifying a plurality of morph weight set transition rules for specifying durational data for the generation of transitionary curves between the plurality of morph weight sets, allowing for the production of a stream of specified morph weight sets to be processed by a computer animation system for integration with other animation, whereby animated lip synchronization and facial expression of animated characters may be automatically produced.

With reference now to FIG. 3, method 10 for automatically animating lip synchronization and facial expression of three dimensional characters for use with a computer animation system is shown including box 56 showing the step of determining means for producing a stream of morph weight sets when a sequence of phonemes is encountered. Box 53, showing the step of evaluating a plurality of time aligned phonetic transcriptions or other timed ata such as pitch, amplitude, noise amounts, and the like, against said determining means for producing a stream of morph weight sets. In box 60 the steps of applying said determining means for producing a stream of morph weight sets to generate an output morph weight set stream, allowing for an appropriate morph weight set correspondence with each of a plurality of time aligned phonetic transcription sub-sequences and correct time parameters applied to a plurality of morph weight set transitions between a representation of a prior time aligned phonetic transcription sub-sequence and a current one, whereby lip synchronization and facial expressions of animated characters is automatically controlled and produced are shown according to the invention.

In operation and use, the user must manually set up default correspondence rules between all visual phoneme groups and morph weight sets. To do this, the user preferably specifies the morph weight sets which correspond to the model speaking, for example the "oo" sound, the "th" sound, and the like. Next, default rules must be specified. These rules specify the durational information needed to generate appropriate transitionary curves between morph weight sets, such as transition start and end times. "transition" between two morph weigh sets is defined as each member of the morph weight set transitions from it's current state to it's target state, starting at the transition start time and ending at the transition end time. The target state is the morph weight set determined by a correspondence rule.

The default correspondence rules and the default morph weight set transition rules define the default system behavior. If all possible visual phoneme groups or all members of alternative data domains have morph weight set correspondence, any phoneme sequence can be handled with this rule set alone. However, additional rules are desirable for effects, exceptions, and uniqueness of character, as further described below.

According to the method of the invention, other rules involving phoneme's duration and/or context can be specified. Also, any other rules that do not fit easily into the above mentioned categories can be specified. Examples of such rules are described in greater detail below and are termed the "secondary rules". If a timed phoneme or sub-sequence of timed phonemes do not fit the criteria for any of the secondary rules, the default rules are applied as seen in FIG. 1.

It is seen that through the use or these rules, an appropriate morph weight stream is produced. The uninterpolated morph weight stream has entries only at transition start and end time, however. These act as keyframes. A morph weight set may be evaluated at any time by interpolating between these keyframes, using conventional methods. This is how the output stream is calculated each desired time frame. For example, for television productions, the necessary resolution is 30 evaluations per second.

The post processing rules may be applied either before or after the above described interpolation step, or both. Some rules may apply only to keyframes before interpolation, some to interpolated data. If applied before the interpolation step, this affects the keyframes. if applied after, it effects the interpolated data. Post processing can use the morph weight sets calculated by the default and secondary rules. Post processing rules can use the morph weigh sets or sequences as in box 44 of FIG. 1, calculated by the default and secondary rules. Post processing rules can modify the individual members of the morph weight sets previously generated. Post processing rules may be applied in addition to other rules, including other post processing rules. Once the rule set up is completed as described, the method of the present invention can take any number and length TAPT's as input, and automatically output the corresponding morph weight set stream as seen in FIGS. 1–3.

For example, a modeled neutral geometric representation of a character for an animated production such as a movies, video, cartoon, CD or the like, with six morph targets, and their delta sets determined. Their representations, for example, are as follows:

| Delta Set | Visual Representation |
|---|---|
| 1 | "h" |
| 2 | "eh" |
| 3 | "l" |
| 4 | "oh" |
| 5 | exaggerated "oh" |
| 6 | special case "eh" used during a "snide laugh" sequences |

In this example, the neutral model is used to represent silence. The following is an example of a set of rules, according to the present method, of course this is only an example of a set of rules which could be use for illustrative purposes, and many other rules could be specified according to the method of the invention.

Default Rules:
  Default Correspondence Rules
Criteria: Encounter a "h" as in "house"
Function: Use morph weight set (1,0,0,0,0,0) as transition target.
Criteria: Encounter an "eh" as in "bet"
Function: Use morph weight set (0,1,0,0,0,0) as transition target.
Criteria: Encounter a "l" as in "old"
Function: Use morph weight set (0,0,1,0,0,0) as transition target.
Criteria: Encounter an "oh" as in "old"
Function: Use morph weight set (0,0,0,1,0,0) as transition target.
Criteria: encounter a "silence"
Function: use morph weight set (0,0,0,0,0,0) as transition target.

Default Transition Rule
Criteria: Encounter any phoneme
Function: Transition start time=(the outgoing phoneme's end time)−0.1*(the outgoing phoneme's duration); transition end time=(the incoming phoneme's start time)+ 0.1* (the incoming phoneme's duration)

Secondary Rules
Criteria: Encounter an "oh" with a duration greater than 1.2 seconds.
Function: Use morph weigh set (0,0,0,0,1,0)
Criteria: Encounter and "eh" followed by an "h" and preceded by an "h".
Function: Use morph weigh set (0,0,0,0,0,1) as transition target.
Criteria: Encounter any phoneme preceded by silence
Function: Transition start time=(the silence's end time)− 0.1*(the incoming phoneme's duration) Transition end time=the incoming phoneme's start time
Criteria: Encounter silence preceded by any phoneme.
Function: Transition start time=the silence's start time−0.1* (the outgoing phoneme's duration)

Post Processing Rules
Criteria: Encounter a phoneme duration under 0.22 seconds.
Function: Scale the transition target determined by the default and secondary rules by 0.8 before interpolation.

Accordingly, using this example, if the user were to use these rules for the spoken word "Hello", at least four morph targets and a neutral target would be required, that is, one each for the sound of "h", "e", "l","oh " and their associated delta sets. For example, a TAPT representing the spoken word "hello" could be configured as,

| Time | Phoneme |
|---|---|
| 0.0 | silence begins |
| 0.8 | silence ends, "h" begins |
| 1.0 | "h" ends, "eh" begins |
| 1.37 | "eh" ends, "l" begins |
| 1.6 | "l" ends, "oh" begins |
| 2.1 | "oh" ends, silence begins. |

The method, for example embodied in computer software for operation with a computer or computer animation system would create an output morph weight set stream as follows:

| Time | D.S.1("h") | D.S.2("eh") | D.S.3("l") | D.S.4("oh") | D.S.5(aux"oh") | D.S.6 |
|---|---|---|---|---|---|---|
| 0.0 | 0 | 0 | 0 | 0 | 0 | 0 |
| 0.78 | 0 | 0 | 0 | 0 | 0 | 0 |

-continued

| Time | D.S.1("h") | D.S.2("eh") | D.S.3("l") | D.S.4("oh") | D.S.5(aux"oh") | D.S.6 |
|---|---|---|---|---|---|---|
| 0.8 | 1 | 0 | 0 | 0 | 0 | 0 |
| 0.98 | 1 | 0 | 0 | 0 | 0 | 0 |
| 1.037 | 0 | 1 | 0 | 0 | 0 | 0 |
| 1.333 | 0 | 1 | 0 | 0 | 0 | 0 |
| 1.403 | 0 | 0 | 1 | 0 | 0 | 0 |
| 1.667 | 0 | 0 | 1 | 0 | 0 | 0 |
| 1.74 | 0 | 0 | 0 | 1 | 0 | 0 |
| 2.1 | 0 | 0 | 0 | 1 | 0 | 0 |
| 2.14 | 0 | 0 | 0 | 0 | 0 | 0 |

Such morph weight sets act as keyframes, marking the transitionary points. A morph weight set can be obtained for any time within the duration of the TAPT by interpolating between the morph weight sets using conventional methods well known in the art. Accordingly, a morph weight set can be evaluated at every frame. However, the post processing rules can be applied to the keyframes before interpolation as in box 36 of FIG. 1, or to the interpolated data as in box 40 of FIG. 1. From such stream of morph weight sets, the neutral model is deformed as described above, and then sent to a conventional computer animation system for integration with other animation. Alternatively, the morph weight set stream can be used directly by an animation program or package, wither interpolated or not.

The rules of the present invention are extensible and freeform in the sense that they may be created as desired and adapted to a wide variety of animation characters, situations, and products. As each rule comprise a criteria and function, as in an "if . . . then . . . else" construct. The following are illustrative examples of other rules which may be used with the present methodology.

For example, use {0,0,0,0 . . . } as the morph weighs, set when a "m" is encountered. This is a type of default rule, where: Criteria: Encounter a "m" phoneme of any duration. Function: Use a morph weight set {0,0,0,0 . . . 0} as a transition target.

Another example would be creating several slightly different morph targets for each phoneme group, and using them randomly each time that phoneme is spoken. This would give a more random, or possibly comical or interesting look to the animation's. This is a secondary rule.

An example of post processing rule, before interpolation would be to add a small amount of random noise to all morph weight channels are all keyframes. This would slightly alter the look of each phoneme to create a more natural look.
Criteria: Encounter any keyframe
Function: Add a small random value to each member of the morph weight set prior to interpolation.

An example of a post processing rule, after interpolation would be to add a component of an auxiliary morph target (one which does not correspond directly to a phoneme) to the output stream in a cyclical manner over time, after interpolation. If the auxiliary morph target had the character's mouth moved to the left, for example, the output animation would have the character's mouth cycling between center to left as he spoke.
Criteria: Encounter any morph weight set generated by interpolation
Function: Add a value calculated through a mathematical expression to the morph weigh set's member that corresponds to the auxiliary morph target's delta set weight. The expression might be, for example: 0.2*sin (0.2*time*2*pi)+0.2. This rule would result in an oscillation of the animated character's mouth every five seconds.

Another example of a secondary rule is to use alternative weight sets (or morph weight set sequences) for certain contexts of phonemes, for example, in an "oh" is both preceded and followed by an "ee" then use an alternate "oh". This type of rule can make speech idiosyncrasies, as well as special sequences for specific words (which are a combination of certain phonemes in a certain context). This type of rule can take into consideration the differences in mouth positions for similar phonemes based on context. For example, the "l" in "hello" is shaped more widely than the "l" in "burly" due to it's proximity to an "eh" as opposed to a "r".
Criteria: Encounter an "l" preceded by an "r".
Function: Use a specified morph weight set as transition target.

Another secondary rule could be, by way of illustration, that if a phoneme is longer than a certain duration, substitute a different morph target. this can add expressiveness to extended vowel sounds, for instance, if a character says "HELLOOOOOOO!" a more exaggerated "oh" model would be used.
Criteria: Encounter an "oh" longer than 0.5 seconds and less than 1 second.
Function: Use a specified morph weight set as a transition target.

If a phoneme is longer than another phoneme of even longer duration, a secondary rule may be applied to create new transitions between alternate morph targets at certain intervals, which may be randomized, during the phoneme's duration. This will add some animation to extremely long held sounds, avoiding a rigid look. This is another example of a secondary rule
Criteria: Encounter an "oh" longer than 1 second long.
Function: Insert transitions between a defined group of morph weight sets at 0.5 second intervals, with transition duration's of 0.2 seconds until the next "normal" transition start time is encountered.

If a phoneme is shorter than a certain duration, its corresponding morph weight may be scaled by a factor smaller than 1. This would create very short phonemes not appear over articulated. Such a post processing rule, applied before interpolation would comprise:
Criteria: Encounter a phoneme duration shorter than 0.1 seconds.
Function: Multiply all members of the transition target (already determined by default and secondary rules by duration/0.1.

As is readily apparent a wide variety of other rules can be created to add individuality to the different characters.

A further extension of the present method is to make a parallel method or system, as depicted in box 14 of FIG. 1, that uses time aligned emotional transcriptions (TAET) that correspond to facial models of those emotions. Using the same techniques as previously described additional morph weight set streams can be created that control other aspects of the character that reflect facial display of emotional state. Such morph weight set streams can be concatenated with the lip synchronization stream. In addition, the TAET data can be used in conjunction with the lip synchronization secondary rules to alter the lip synchronization output stream. For example:

Criteria: An "L" is encountered in the TAPT and the nearest "emoteme" in the TAET is a "smile".

Function: Use a specified morph weight set as transition target.

As is evident from the above description, the automatic animation lip synchronization and facial expression method described may be used on a wide variety of animation products. The method described herein provides an extremely rapid, efficient, and cost effective means to provide automatic lip synchronization and facial expression in three dimensional animated characters. The method described herein provides, for the first time, a rapid, effective, expressive, and inexpensive means to automatically create animated lip synchronization and facial expression in animated characters. The method described herein can create the necessary morph weight set streams to create speech animation when given a time aligned phonetic transcription of spoken text and a set of user defined rules for determining appropriate morph weight sets for a given TAPT sequence. This method also defines rules describing a method of transitioning between these sets through time. The present method is extensible by adding new rules, and other timed data may be supplied, such as time "emotemes" that will effect the output data according to additional rules that take this data into account. In this manner, several parallel systems may be used on different types of timed data and the results concatenated, or used independently. Accordingly, additional advantages and modification will readily occur to those skilled in the art. The invention in its broader aspects is, therefore, not limited to the specific methodological details, representative apparatus and illustrative examples shown and described. Accordingly, departures from such details may be made without departing from the spirit or scope of the applicant's inventive concept.

What is claimed is:

1. A method for automatically animating lip synchronization and facial expression of three-dimensional characters comprising:

obtaining a first set of rules that defines a morph weight set stream as a function of phoneme sequence and times associated with said phoneme sequence;

obtaining a plurality of sub-sequences of timed phonemes corresponding to a desired audio sequence for said three-dimensional characters;

generating an output morph weight set stream by applying said first set of rules to each sub-sequence of said plurality of sub-sequences of timed phonemes; and applying said output morph weight set stream to an input sequence of animated characters to generate an output sequence of animated characters with lip and facial expression synchronized to said audio sequence.

2. The method of claim 1, wherein said first set of rules comprises:

correspondence rules between all visual phoneme groups and morph weight sets; and morph weight set transition rules specifying durational data between morph weight sets.

3. The method of claim 2, wherein said durational data comprises transition start and transition end times.

4. The method of claim 1, wherein said desired audio sequence is from a pre-recorded live performance.

5. The method of claim 1, wherein said desired audio sequence is synthetically generated by a computer.

6. The method of claim 1, wherein said plurality of subsequences of timed phonemes is obtained from a file.

7. The method of claim 1, wherein said plurality of subsequences of timed phonemes is generated during animation.

8. The method of claim 1, wherein said output sequence of animated characters is transmitted over a computer network.

9. The method of claim 1, wherein said generating said output morph weight stream comprises:

generating an appropriate morph weight set corresponding to each subsequence of said timed phonemes; and generating time parameters for transition of said appropriate morph weight set from a morph weight set of a prior sub-sequence of said timed data.

10. The method of claim 1, wherein each of said first set of rules comprises a rule's criteria and a rule's function.

11. The method of claim 10, wherein said generating an output morph weight set stream comprises:

checking each sub-sequence of said plurality of subsequences of timed data for compliance with said rule's criteria; and generating an output morph weight set and transition parameters by applying said rule's function upon said compliance with said criteria.

12. The method of claim 1, wherein said first set of rules comprises a default set of rules and an optional secondary set of rules, said secondary set of rules having priority over said default set of rules.

13. The method of claim 1, wherein said plurality of subsequences of timed phonemes comprises a timed aligned phonetic transcriptions sequence.

14. The method of claim 1, wherein said plurality of subsequences of timed phonemes comprises time aligned data.

15. The method of claim 13, wherein said plurality of subsequences of timed phonemes further comprises time aligned emotional transcription data.

16. The method of claim 9, wherein said transition parameters comprises:

transition start time; and transition end time.

17. The method of claim 16, further comprising:

generating said output morph weight set stream by interpolating between morph weight sets at said transition start time and said transition end time according to a desired frame rate of said output sequence of animated characters.

18. The method of claim 1, further comprising:

applying a second set of rules to said output morph weight set prior to said generating of said output sequence of animated characters.

19. An apparatus for automatically animating lip synchronization and facial expression of three-dimensional characters comprising:

a computer system;

computer code in said computer system, said computer code comprising:

a method for obtaining a first set of rules that defines a morph weight set stream as a function of phoneme sequence and times associated with said phoneme sequence;

a method for obtaining a plurality of sub-sequences of timed phonemes corresponding to a desired audio sequence for said three-dimensional characters;

a method for generating an output morph weight set stream by applying said first set of rules to each sub-sequence of said plurality of subsequences of timed phonemes;

a method for applying said output morph weight set stream to an input sequence of animated characters to generate an output sequence of animated characters with lip and facial expression synchronized to said audio sequence.

20. The apparatus of claim 19, wherein said first set of rules comprises:

correspondence rules between all visual phoneme groups and morph weight sets; and morph weight set transition rules specifying durational data between morph weight sets.

21. The apparatus of claim 20, wherein said durational data comprises transition start and transition end times.

22. The apparatus of claim 19, wherein said desired audio sequence is from a pre-recorded live performance.

23. The apparatus of claim 19, wherein said desired audio sequence is synthetically generated by a computer.

24. The apparatus of claim 19, said plurality of subsequences of timed phonemes is obtained from a file.

25. The apparatus of claim 19, wherein said plurality of subsequences of timed phonemes is generated during animation.

26. The apparatus of claim 19, wherein said output sequence of animated characters is transmitted over a computer network.

27. The apparatus of claim 19, wherein said generating said output morph weight stream comprises:

generating an appropriate morph weight set corresponding to each subsequence of said timed phonemes; and generating time parameters for transition of said appropriate morph weight set from a morph weight set of a prior sub-sequence of said timed data.

28. The apparatus of claim 19, wherein each of said first set of rules comprises a rule's criteria and a rule's function.

29. The apparatus of claim 28, wherein said generating an output morph weight set stream comprises:

checking each sub-sequence of said plurality of sub-sequences of timed data for compliance with said rule's criteria; and generating an output morph weight set and transition parameters by applying said rule's function upon said compliance with said criteria.

30. The apparatus of claim 19, wherein said first set of rules comprises a default set of rules and an optional secondary set of rules, said secondary set of rules having priority over said default set of rules.

31. The apparatus of claim 19, wherein said plurality of subsequences of timed phonemes comprises a timed aligned phonetic transcriptions sequence.

32. The apparatus of claim 19, wherein said plurality of subsequences of timed phonemes comprises time aligned data.

33. The apparatus of claim 31, wherein said plurality of subsequences of timed phonemes further comprises time aligned emotional transcription data.

34. The apparatus of claim 27, wherein said transition parameters comprises:

transition start time; and transition end time.

35. The apparatus of claim 34, wherein said computer code further comprises:

a method for generating said output morph weight set stream by interpolating between morph weight sets at said transition start time and said transition end time according to a desired frame rate of said output sequence of animated characters.

36. The apparatus of claim 19, wherein said computer code further comprises:

a method for applying a second set of rules to said output morph weight set prior to said generating of said output sequence of animated characters.

* * * * *